United States Patent
McIntyre et al.

(10) Patent No.: US 7,991,282 B1
(45) Date of Patent: Aug. 2, 2011

(54) METHOD AND CIRCUIT FOR CHARGING OF SUPER CAPACITOR AS ENERGY SOURCE FOR FLASH DIODES

(75) Inventors: William J. McIntyre, Wheatland, CA (US); John Philip Parry, Grass Valley, CA (US); Nathanael Griesert, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 259 days.

(21) Appl. No.: 12/330,448

(22) Filed: Dec. 8, 2008

(51) Int. Cl.
  *G03B 7/26* (2006.01)
  *H05B 37/00* (2006.01)
(52) U.S. Cl. ............... 396/205; 315/241 P; 315/241 S
(58) Field of Classification Search .......... 396/205, 396/206, 164; 315/200 A, 241 P, 241 S; 320/135
  See application file for complete search history.

(56) References Cited

U.S. PATENT DOCUMENTS

| | | | |
|---|---|---|---|
| 2006/0159441 A1* | 7/2006 | Feng et al. | 396/206 |
| 2008/0136960 A1* | 6/2008 | Kawakami | 348/371 |
| 2009/0128045 A1* | 5/2009 | Szczeszynski et al. | 315/185 R |

* cited by examiner

*Primary Examiner* — W. B. Perkey
*Assistant Examiner* — Minh Q Phan

(57) ABSTRACT

A circuit and method for charging a super capacitor to an optimal voltage that provides a desired flash diode current value while minimizing power dissipation in circuit elements other than the flash diode. One embodiment uses periodic sampling of the current through the flash diode and termination of the charging upon the super capacitor having been charged to a voltage value that produces the desired flash diode current. Another embodiment includes a current regulator in the flash diode firing circuit that keeps the current at a substantially constant level during the time that the flash diode is being fired.

20 Claims, 5 Drawing Sheets

METHOD AND CIRCUIT FOR CHARGING OF SUPER CAPACITOR AS ENERGY SOURCE FOR FLASH DIODES

FIELD OF THE INVENTION

The invention is related to electronic circuits, and in particular, to a method and circuit for charging a super capacitor to the optimal voltage needed to produce a desired flash current.

BACKGROUND OF THE INVENTION

Devices such as cameras and cell phones having camera capability use a flash source to produce a light output to enable a picture to be taken. Such devices typically have one or more flash diodes, actually LEDs (light emitting diodes), that emit white light when fired. The flash diode firing current is supplied from a voltage source, such as a lithium ion battery, that is carried by the camera or cell phone.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Figure 1:
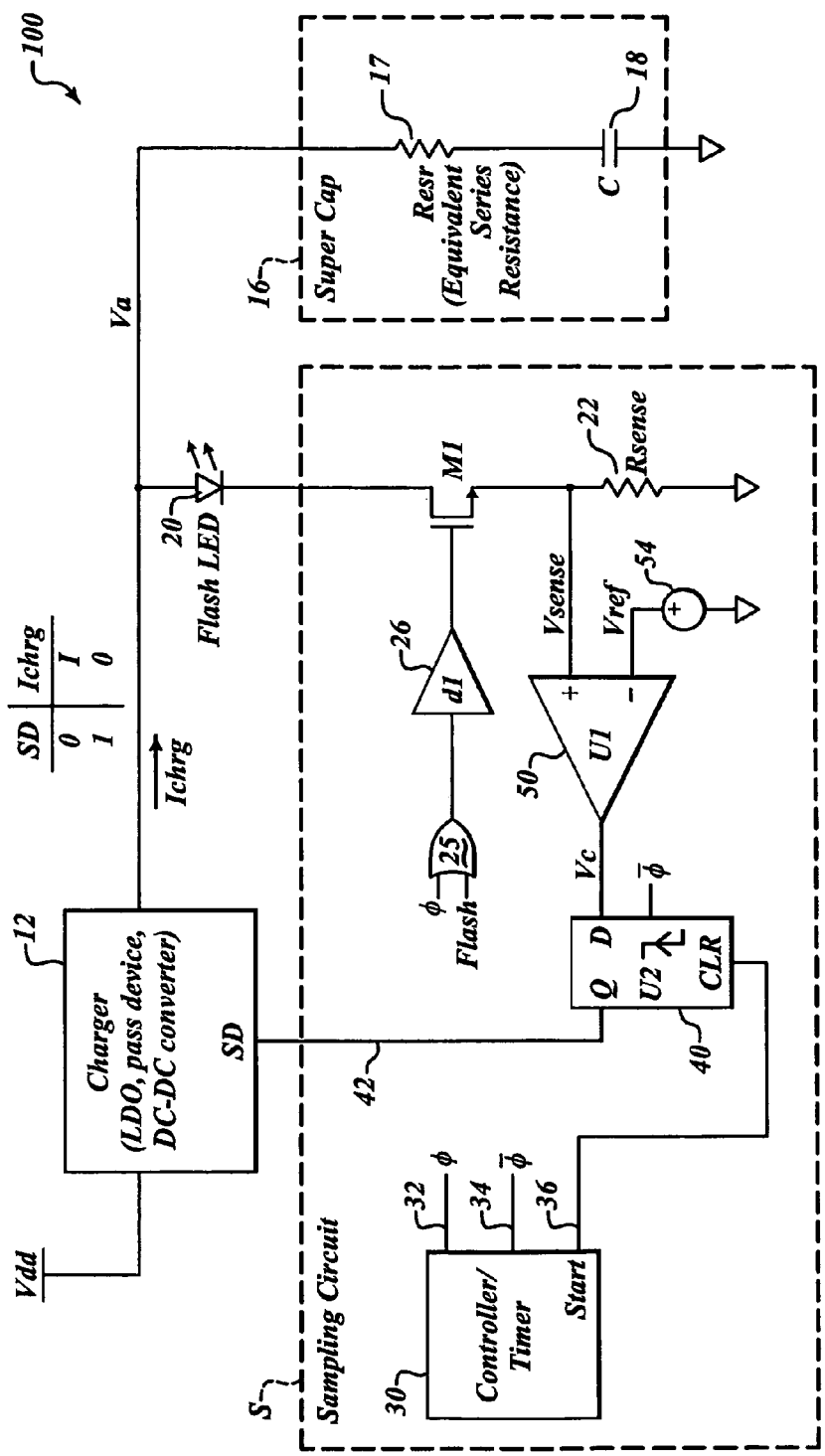
FIG. 1 is a circuit diagram of a first embodiment of the invention.

Briefly stated, the invention is related to a circuit having a flash diode that is supplied current from the voltage stored by a super capacitor in which the voltage to which the super capacitor is charged is controlled to an optimal value so as to produce a desired optimal current value that fires the diode. This minimizes the power that has to be dissipated in circuit elements other than the flash diode when the flash diode is fired. In one embodiment of the invention, a circuit is provided that operates to charge the super capacitor while periodically firing the flash diode for very small time periods to sample the magnitude of the current through the flash LED at each of the sampling times and to optimally terminate the charging of the super capacitor at a voltage value that will produce the predetermined desired flash diode current when the diode is fired. This method of determining the charge termination instantly results in the optimal voltage on the super capacitor, which guarantees adequate voltage to provide the desired flash current, while minimizing power dissipation in all elements other than the flash diode.

One embodiment of the circuit includes a charger to supply the charging voltage to the super capacitor whose output voltage is applied to a series circuit of the flash diode, a switching transistor, and a resistor used for sensing the current flowing in the series circuit. A controller starts a charging cycle for the super capacitor and affects the periodic sampling of the flash current by making the switching transistor conduct for short periods of time so that current flows through the flash diode and the sensing resistor. The magnitude of the flash current during each short sampling period increases with increasing super capacitor charge voltage and provides an indication as to when the super capacitor voltage is just high enough to deliver a given magnitude of current through the flash diode, switching transistor, and series sensing resistor. The voltage developed across the sensing resistor is applied to one input of a comparator whose other input is a reference voltage that, in conjunction with the sense resistor value, sets the predetermined desired flash current that is used to test for the optimal value of voltage to which the super capacitor is to be charged in order to achieve the desired current as the diode is flashed. When the comparator determines that the charge voltage level of the super capacitor is at the desired optimal value, the charging of the super capacitor is terminated.

In another embodiment of the invention, a circuit is provided that adds the feature of keeping the current of the flash diode at a substantially constant level during the entire period of the firing of the flash diode when a sufficient voltage value has first been established on the super capacitor. This enables the super capacitor optimal voltage to be determined so that fall off in current supplied to the flash diode as the voltage of the super capacitor decreases during the time that the flash diode is being fired does not occur.

In a device that has one or more flash LEDs that emit white light when fired, the total amount of light output that is generated by the LEDs is proportional to the number of LEDs and the current supplied to each of them. The light output that is required by the camera image sensor determines the number of diodes used and the current supplied to each. A camera, cell phone, or other device can have one or more flash diodes connected in any desired series, parallel or series-parallel configuration as is required to produce the desired light output quantity. All of these configurations of one or more flash diodes are hereafter included within the use of the singular term "flash diode" hereinafter in the specification and claims.

Various embodiments of the invention include a super capacitor. A super capacitor is a capacitor that has a high energy density when compared to common capacitors, typically on the order of thousands of times greater than a high-capacity electrolytic capacitor. Super capacitors having capacitance values of 0.1-1 F are currently commercially available. In a circuit including flash diodes and a super capacitor as described above, the super capacitor is charged from the battery by a charger to a voltage and the charge is stored. The super capacitor output voltage is applied to a series circuit of the flash diode and a switching device, such as a transistor, and the flash occurs by making the switching transistor go conductive causing current to flow through the flash diode. Embodiments of the invention relate to having a flash diode that is supplied current from the voltage stored by a super capacitor in which the voltage to which the super capacitor is charged is controlled to an optimal value so as to produce a desired optimal current value that fires the diode.

Referring to FIG. 1, the circuit 100 operates from a source of voltage Vdd that can be a lithium ion, or any other type of battery, or the like. The voltage Vdd is applied to the input of charger circuit 12 which can be any suitable circuit such as an LDO (low drop out linear regulator), pass device such as an MOS or bipolar transistor, a current-limited switch, or any suitable type of DC-to-DC voltage converter. The charger 12 can have a boost capability to enable it to produce an output voltage of greater value than Vdd or a buck capability to produce an output voltage less the value of Vdd. In other embodiments, the charger may include other configurations, such as buck-boost or the like. The charger 12 produces a charging current Ichrg that is supplied to the upper terminal of a super capacitor 16 which charges to an increasing voltage Va as the charging current is being supplied. The super capacitor 16 has an equivalent series resistance component Resr 17, such as caused by its connecting leads and other non-idealities, and a capacitor C component 18. In some embodiments, the lower terminal of the super capacitor is connected to a point of reference potential such as ground.

There is a flash diode 20. In one embodiment, the flash diode 20 is an LED that has a white light output. Again, while only one flash diode is shown, in other embodiments, also within the scope and spirit of the invention, include a plurality of these diodes that can be used connected in any desired series, parallel or series-parallel configuration as is required to produce the desired light output quantity. All of these configurations of one or more flash diodes are hereafter included within the use of the singular term "flash diode".

The flash diode 20 has its anode coupled to the output terminal of the super capacitor to receive the capacitor voltage charge Va. Circuit 100 has a sampling circuit section S, which is arranged as follows in one embodiment. The cathode of the flash diode is coupled to the drain of a switching transistor M1 whose source is connected to the upper terminal of a resistor 22 (Rsense) whose lower terminal is connected to ground. The resistor 22 senses the current flowing through the flash diode 20 and transistor M1 when M1 is conducting with the current sensed being represented by the voltage Vsense developed across the resistor 22. When transistor M1 conducts, the voltage Vsense provides an indication of how much flash current the super capacitor can deliver to the LED given the present voltage charge Va on the super capacitor.

In this embodiment, there is a controller-timer 30 that has three outputs. These are a periodic clock signal phi on line 32, the inverted version of phi on line 34, and a start clock pulse on line 36. A switch driver, or buffer 26, receives its input from the output of an OR gate 25 and has its output connected to the gate of transistor M1. One input to the OR gate 25 is the periodic clock signal phi on the controller-timer output line 32. The clock signal phi is used to make transistor M1 periodically conduct as the super capacitor is being charged so as to sample the current that flows through the flash diode and the transistor M1, which is a function of the present value of the voltage Va to which the super capacitor has been charged. The second OR gate input is a "flash" operating signal produced by the camera or cell phone when the flash diode 20 is to be fired. The camera or cell phone has a button or switch that the user operates to produce the flash operating signal. The flash operating signal is a voltage that causes transistor M1 to conduct and fire the flash diode.

In this embodiment, a flip flop 40 of the DQ type has a CLR input to which the start clock pulse output on line 36 of the controller 30 is applied. When CLR is a logic high, Q is forced to a logic low. The inverted version of the clock signal phi on line 34 of the controller is applied to the Z input of the flip-flop 40. The Z input signifies a rising edge clock trigger and this indicates that the input at D is transferred to the output Q on the rising edge of the input clock pulse. The Q output of the flip-flop 40 produces a shutdown signal that is applied over line 42 to the SD (Shut Down) input of charger 12 to turn it off and stop the charging of the super capacitor 16.

In this embodiment, a comparator 50 receives the voltage Vsense from the upper end of the sensing resistor 22 at its non-inverting (+) input. The inverting (−) input of comparator 50 is from a voltage reference source 54 that sets a voltage reference level Vref that sets the target Vsense that corresponds, in conjunction with sensing resistor 22, to the target desired flash current. When during a sampling period Vsense reaches the level of Vref, the optimum voltage Vopt to which the super capacitor 16 is to be charged has been reached, and the resulting output transition of the comparator 50 indicates that the optimal super capacitor voltage has been reached. The capacitor voltage value Vopt is the value at which the capacitor is just able to provide the desired target flash current and the charging of the capacitor is terminated. The optimum capacitor voltage value is that needed to fire the flash diode at the predetermined target flash current so as not to produce excess heat that will have to be dissipated by the transistor M1 and possibly other components of the camera device.

Figure 1A:
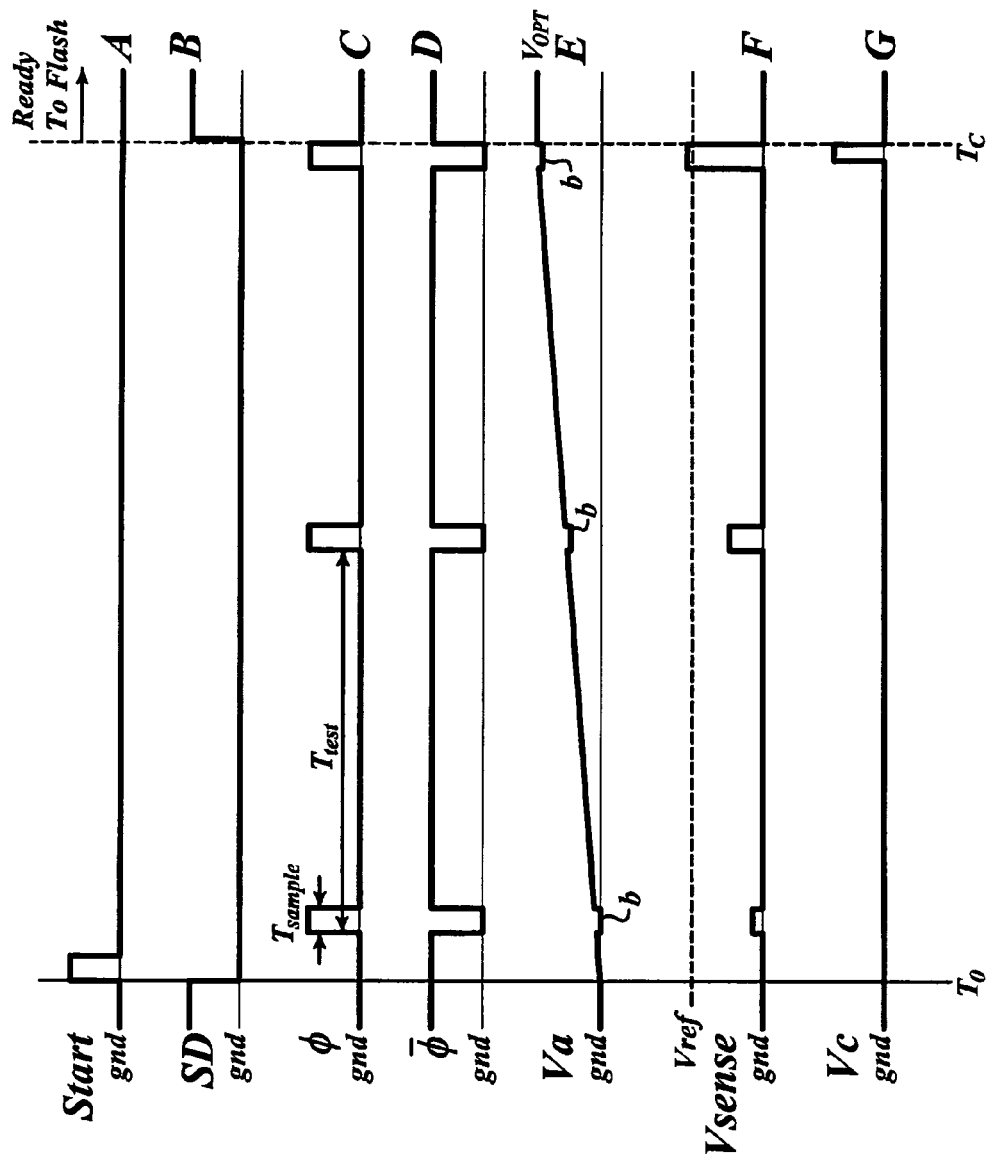
FIG. 1A includes timing diagrams associated with an embodiment of the circuit of FIG. 1.

The operation of an embodiment of the circuit 100 is explained referring to the timing chart of FIG. 1A. A charging cycle for the super capacitor starts at time To and ends at time Tc when the super capacitor 16 is charged to the voltage Vopt. Upon completion of the charging of the super capacitor to its optimal voltage, the charge is held until the user of the camera fires the flash diode by actuating the "flash" switch connected to the OR gate 25 input. This applies a firing signal that causes the transistor M1 to conduct and produce a current by discharging the super capacitor that fires the flash diode.

Line A of FIG. 1A shows a start clock pulse that is produced by controller 30 on line 36 that is applied to the CLR input of the flip-flop 40 to reset it. This causes the flip flop output Q to transition from the initial logic high state shown, to a logic low state. Line B shows this signal that is applied on line 42 and which is the shutdown logic signal for the charger 12. When line 42 is logically low, the charger will produce Ichrg and start to charge the super capacitor. The controller 30 can produce the start clock pulse upon the camera being turned on, after the flash diode has been fired, when a capacitor optimal voltage charge refresh is desired, or for any other desired reason to establish the optimal capacitor charge voltage.

The voltage charge Va on the super capacitor is shown on line E and it is a rising linear ramp for the case when Ichrg is a constant, which it may or may not necessarily be. Lines C and D show the periodic clock signals phi and not(phi) on lines 32 and 34 of the controller 30.

The periodic clock signal phi on line 32 of the controller 30 is applied through the OR gate 25 to the input of the switch driver 26. The logical high intervals of the signal phi define the sampling interval of the flash current. The sampling intervals occur periodically during the time that the current Ichrg from the charger 12 increases the charge voltage Va on the super capacitor 16. These logic high intervals of phi cause the transistor M1 to conduct. M1 conduction causes current to flow through the flash diode to briefly fire it and also causes current to flow through the resistor 22 to produce Vsense. The duration of the sampling intervals produced by the clock signals on controller output line 32 are very short relative to the entire time needed to charge the super capacitor.

The sampling intervals are minimized so that super capacitor discharge is minimal during the charging of the super capacitor. This helps to minimize the time required to charge the super capacitor to the optimal voltage. As shown on line E there is a slight decrease, or "blip", "b", in the super capacitor charge voltage Va each time that a sampling pulse causes the transistor M1 to conduct. While three clock sampling pulses are shown on line C of FIG. 1A during the super capacitor charging period from To to Tc, there can be as many of these sampling pulses as desired. In practice Va changes very little between the intervals of the sampling pulses, and the time between sampling intervals is chosen to be much shorter than the over all time required to charge the super capacitor so that the optimal voltage is determined precisely and accurately.

The waveform on line E is shown as changing relatively quickly for purposes of illustration.

Current flows through the current sensing resistor 22 at the time of each sampling pulse to produce voltage Vsense that is applied to the (+) input of the comparator 50. The voltage Vsense shown on line F indicates the present value of current when the flash diode is fired and this corresponds to the present super capacitor charge voltage Va. The sampled value of Vsense increases as the capacitor charging progresses. The comparator 50 produces an output Vc that is logically high when Vsense is greater than the reference voltage Vref from source 54, and an output Vc that is logically low when Vsense is less than Vref from source 54.

At the end of each sampling interval the signal not(phi) from the controller line 34 transitions from low to high and triggers the transfer of the logical signal present at D, provided by Vc, to the output Q of flip flop 40. The Q output is supplied to the charger 12 over line 42. In the case that Vsense<Vref, SD stays low and charging continues. When Vsense>Vref, SD is driven high and charging stops. The signal Vc is shown on line G. At time Tc the logic high from Vc is transferred to Q and the super capacitor is charged to its optimum voltage value Vopt that will produce the predetermined current value with which to fire the flash diode. The optimal voltage value of Vopt for the circuit 100 that results from the charging method is:

$$V_{OPT} = V_{LED} + I_{Flash}(R_{ON\_M1} + R_{ESR} + R_{sense}) \quad (1)$$

Where Vled is the forward voltage of LED 20, $I_{FLASH}$ is the pre-determined diode flash current, $R_{ON\_M1}$ is the on resistance of transistor M1 when conducting, $R_{ESR}$ is the resistance of resistor 17, and $R_{sense}$ is the resistance of sense resistor 22. $I_{FLASH}$ is the magnitude of the current that exists in the flash diode during the last sample interval before charge termination, and also at the beginning of a flash firing period. Its value is:

$$I_{Flash}(t = 0+) = \frac{V_{ref}}{R_{SENSE}} \quad (2)$$

The super capacitor can hold the charge voltage Vopt until the user of the camera or cell phone actuates the button or switch that produces the flash signal at the input of the OR circuit 25. This causes the switch driver 26 to produce a signal that makes the transistor M1 conduct and fire the flash diode 20. The desired value (i.e., target value) of current that flows through the flash diode and the transistor M1 is set by the voltage Vref and resistor Rsense. The optimum voltage Vopt to which the super capacitor has been charged guarantees that the desired value of current can be provided.

Figure 2:
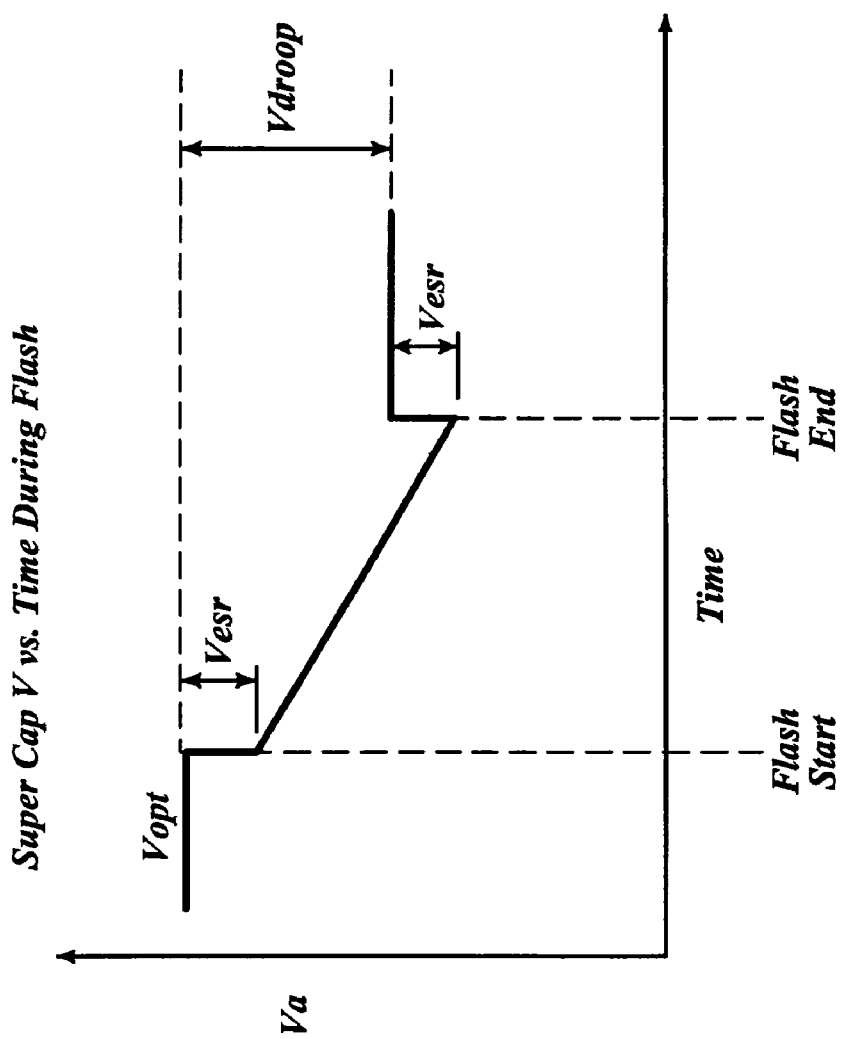
FIG. 2 is diagram showing the fall off of voltage supplied by the super capacitor during the period of the firing of the flash diode for an embodiment of the circuit of FIG. 1.

As discussed above, the circuit of FIG. 1 operates to charge the super capacitor to an optimum voltage that produces the desired predetermined current value in the flash diode when fired. FIG. 2 shows the effect on the stored super capacitor voltage during the time that the flash diode is being fired. This time in some measure depends on how long the camera operator actuates the firing switch. The super capacitor stored voltage for flashing the diode at the desired current value is at its optimum voltage charge value Vopt prior to the time of the user actuating the firing switch. At the time of firing, shown as "flash start", the super capacitor starts to supply voltage Va to the flash diode from a value somewhat below Vopt due to the voltage drop Vesr across the super capacitor equivalent series resistance 17. The voltage supplied from the super capacitor to the flash diode, Va, decreases in a pseudo-linear manner during the time that the flash diode is being fired until the end of the firing "Flash End". At that time Va will increase by $V_{esr}$ since the current through Resr 17 goes to zero.

As seen in FIG. 2, during the time of the flash diode firing period the voltage Va supplied to the flash diode decreases from Vopt by an amount Vdroop. As the voltage supplied from the super capacitor to the flash diode decreases during the firing period, the current through the flash diode decreases in a similar manner. That is, the current supplied to the diode is below the desired pre-determined value that is achieved only initially on the firing of the flash LED. In this embodiment, the light output of the flash diode decreases over the duration of the flash as the firing current decreases.

Figure 3:
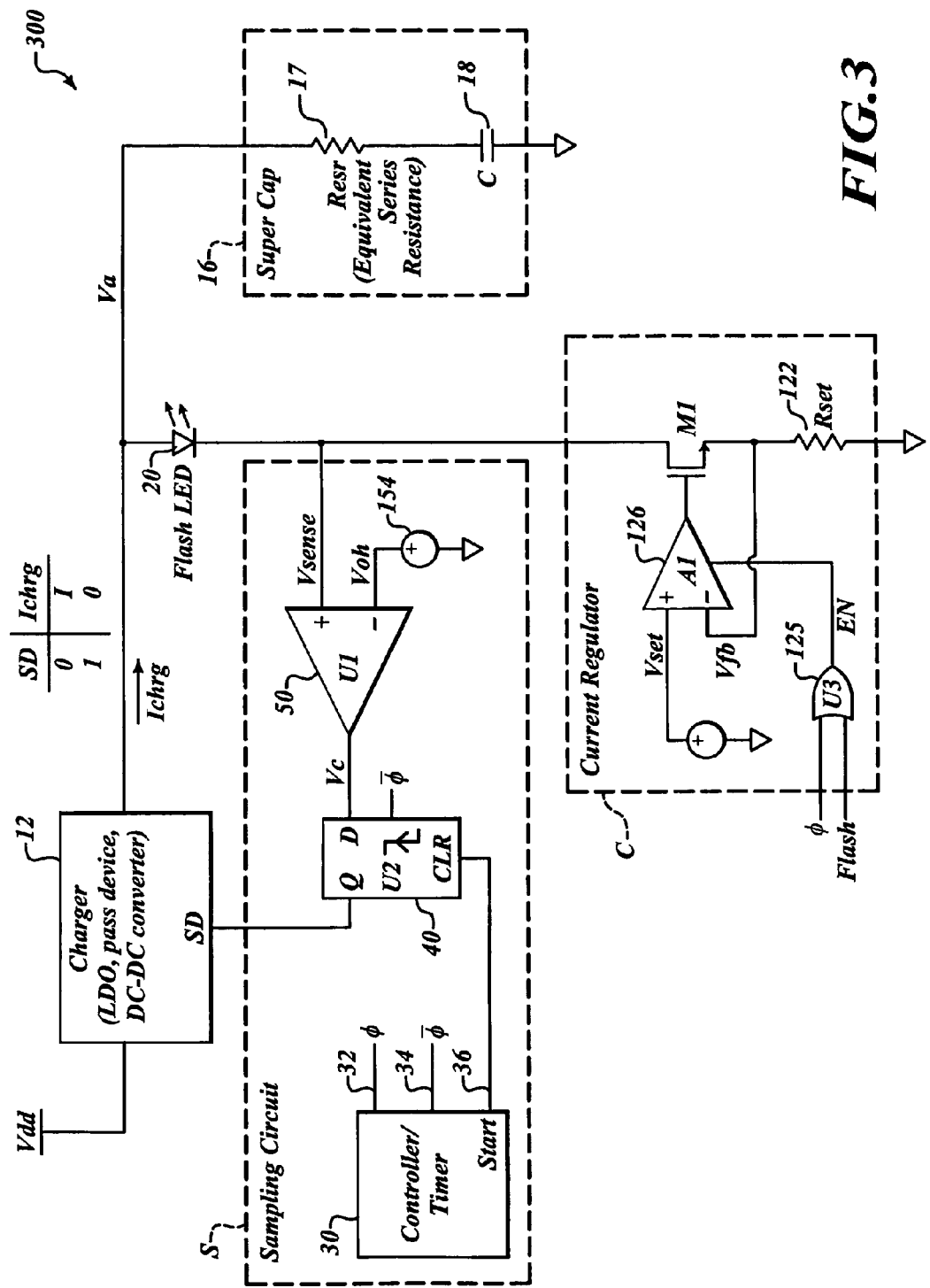
FIG. 3 is a circuit diagram of another embodiment of the circuit of FIG. 1.

FIG. 3 shows an embodiment of circuit 300. Circuit 300 is a modification of circuit 100 of FIG. 1, where circuit 300 provides for the elimination of the current decrease during the flash diode firing period as explained above.

Circuit 300 has the sampling section S and also has a current regulator section C. It differs from that of circuit 100 of FIG. 1 in that the switch driver 26 circuit 100 of FIG. 1 has been replaced by amplifier 126, and the voltage Vsense that is an input to the comparator 50 is taken from the drain of M1, rather than from the source of M1 as in FIG. 1. A resistor 122 is connected from the source of M1 to ground.

In circuit 300, a voltage $V_{set}$ from a source 127 applied to the non-inverting input of amplifier 126, the amplifier 126, transistor M1, and resistor 122 form a negative feedback system that operates as a current regulator that is arranged to provide a well regulated current through the drain of transistor M1 by regulating the voltage Vfb at the source of M1 to the voltage $V_{set}$ that is applied at the non-inverting input of amplifier 126. An OR gate 125 receives the sampling voltage signal phi from controller line 32 at one input and the flash firing signal voltage at a second input. The OR gate 125 has an output EN applied to amplifier 126. When the EN input to the amplifier 126 is high, the current regulator is enabled and current conducts. When the signal EN is low, amplifier 126 drives the gate of M1 low and current flow is ceased. When EN is high, the regulated current that flows into the drain of M1 is equal to the voltage $V_{set}$ at the amplifier 126 non-inverting input divided by the resistance Rset of resistor 122.

If the voltage at the drain of M1 is too low, the amplifier 126 drives the gate voltage of M1 as high as the output compliance of the amplifier allows but the source of M1 does not rise to a voltage equal to that at the non-inverting input of 126. When this condition exists the current regulator composed of amplifier 126, transistor M1, resistor 122, and the voltage $V_{set}$ at the non-inverting input of amplifier 126 is said to be in "drop out", meaning that the current regulator is not providing the desired output current determined by the reference input Vset and resistor 122.

For M1 drain voltages above a minimum value, the current regulator circuit keeps the M1 drain current very constant. The voltage that is required at the drain of M1 so that the desired output current is regulated is:

$$V_{OH\_min} = V_{SET}\left(1 + \frac{R_{ON\_M1}}{R_{set}}\right) \quad (3)$$

Where $V_{SET}$ is the voltage applied at the non-inverting input of amplifier 126, $R_{ON\_M1}$ is the "on" resistance of transistor M1, and $R_{set}$ is the resistance of resistor 122. For M1 drain voltages less than $V_{OH\_min}$, M1 drain current is less than $V_{set}/R_{set}$. For M1 drain voltages greater than or equal to $V_{OH\_min}$, M1 drain current is equal to $V_{set}/R_{set}$.

Circuit 300 operates very similarly to the circuit 100 of FIG. 1 with the difference being that the super capacitor optimal charge voltage Vopt is determined as the minimum capacitor voltage necessary to provide a constant flash current over the desired duration of the flash pulse. The optimal charge voltage Vopt in this case is that voltage which will allow the current regulator to remain out of the drop out condition throughout the flash duration, and will result in the drain voltage of M1 decaying to $V_{OH\_min}$ at the instant just prior to the end of the flash duration. This optimal voltage again minimizes power dissipation during the flash event, but now provides exactly the right "overhead voltage" so that a constant current can be maintained throughout the flash pulse. This is explained by referring to FIG. 3A.

Figure 3A:
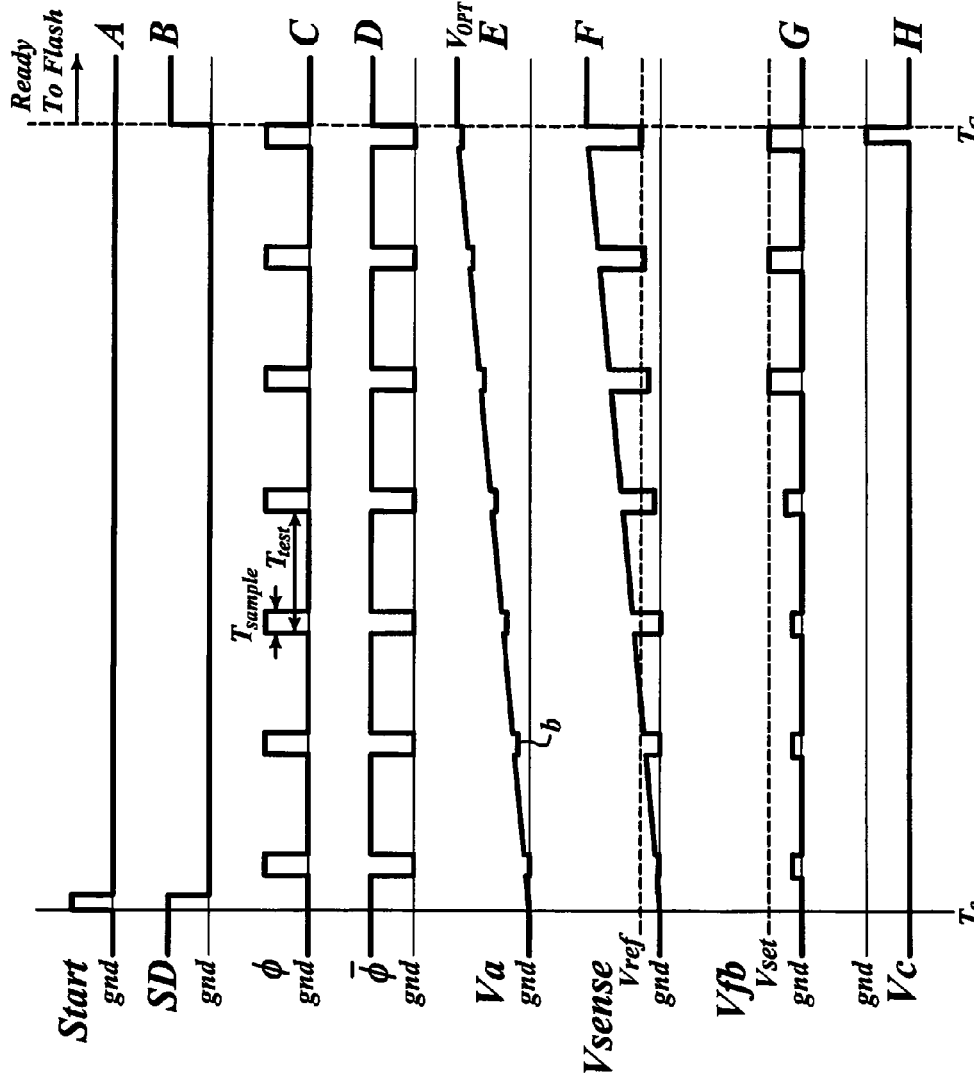
FIG. 3A includes timing diagrams associated with an embodiment of the circuit of FIG. 3, in accordance with aspects of the present invention.

Line A of FIG. 3A shows the start clock pulse that starts the charging at To. This causes the flip flop 40 output Q to transition from the initial logic high state shown, to a logic low state. Line B shows this signal that is applied to the shutdown logic input for the charger 12. When the shutdown input is a logic low, the charger produces Ichrg and start to charge the super capacitor. The controller 30 can produce the start clock pulse upon the camera being turned on, after the flash diode has been fired, when a capacitor optimal voltage charge refresh is desired, or for any other desired reason to establish the optimal capacitor charge voltage. Lines C and D show the periodic clock signals phi and not(phi) on lines 32 and 34, respectively, of the controller 30 with the high pulse intervals on line C being the current regulator overhead sampling pulses. The voltage charge Va on the super capacitor is shown on line E and it is shown as a rising linear ramp in this illustration.

As the super capacitor is being charged, the clock signal phi on line 32 of the controller 30 is applied to the OR gate 125 that actuates the EN input of amplifier 126. The OR gate 125 is used so that when either of the signals phi or Flash are a logic high, the current regulator conducts. When the terminals of the current regulator have a voltage higher than $V_{OH\_min}$, the current regulator sinks a current equal to Vset/Rsense. When neither signal Flash nor phi is a logic high, the current regulator sinks no current. Line F shows that the drain voltage Vsense of M1 is pulled low during each sampling pulse interval as the current regulator pulls current through the flash diode. Line G shows the voltage Vfb over the charge period, and illustrates that Vfb increases with Va during test pulses until Va is sufficient to provide a voltage greater than or equal to $V_{OH\_min}$ at the drain of M1.

After this time, the voltage during sampling pulses on line G is regulated to Vfb, indicating that a fixed test current is being fired during each interval from that time on. The sampling pulses continue until the Vsense voltage at the end of a test pulse as shown on line F reaches or just exceeds the reference voltage $V_{oh\ applied}$ to t the inverting (−) input of comparator 50, which is set based on the predetermined desired flash current, flash duration, M1 on-resistance, sense resistance 126, and super capacitor C value C 18. When Vsense exceeds $V_{OH}$ during a test pulse, the comparator 50 output Vc transitions high, and when the signal not(phi) transitions high, the logic high D input to the flip flop 40 is transferred to Q and shuts down the charger 12. This event is shown to occur at time Tc in FIG. 3A.

The reference voltage $V_{OH}$ can be set by the following equation to account for the "drop out" voltage $V_{OH\_min}$ of the current regulator and the droop voltage of the super capacitor that occurs over the desired flash duration:

$$V_{OH} = I_{Flash}(R_{ON\_M1} + R_{set}) + V_{droop} = I_{Flash}(R_{ON\_M1} + R_{set}) + \frac{I_{Flash}}{C}T_{Flash}, \quad (4)$$

Where $I_{Flash}$ is the predetermined desired flash current Vset/Rsense, $T_{Flash}$ is the flash duration, $R_{ON\_M1}$ is the M1 on resistance, $R_{set}$ is the current regulator set resistance, and C is the capacitance of the super capacitor.

While seven clock sampling pulses are illustratively shown on line C of FIG. 3A during the super capacitor charging period from To to Tc, there can be as many of these sampling pulses as desired. In practice Va changes very little between the intervals of the sampling pulses, and the time between sampling intervals is chosen to be much shorter than the overall time required to charge the super capacitor so that the optimal voltage is determined precisely and accurately. The waveform on line E of FIG. 3A is shown as changing relatively quickly for purposes of illustration only. The super capacitor optimal charge voltage that is reached when the value of reference voltage 154 is set equal to $V_{OH}$ determined by equation (4) is:

$$V_{OFT} = V_{LED} + I_{Flash}(R_{ON\_M1} + R_{set}) + V_{droop} + I_{Flash}R_{ESR} \quad (5)$$

The only difference between this resulting optimal voltage of equation (5) for an embodiment of circuit 300 and that of equation (1) for an embodiment of circuit 100 of FIG. 1 is that equation (5) has the term $V_{droop}$. This term represents the voltage droop that occurs on the super capacitor during the flash pulse determined by the flash duration, flash current level, and super capacitor capacitance.

When the user actuates the diode firing button or switch, the current regulator is enabled. At this time, the amplifier 126 impresses the voltage Vset across the Rset resistor 122 making the flash current equal to Vset/Rset. The current regulator maintains the desired current value substantially constant for the predetermined duration that the flash button or contact is actuated. Therefore, there will be a substantially steady current flow through the flash diode during its entire firing time and the Vdroop caused by the discharge of the super capacitor as shown in FIG. 2 will not affect the diode light output.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the invention. All such changes and modifications are within the patented scope of the appended claims.

We claim:
1. A circuit for a photo flash, comprising:
a super capacitor;
a charging circuit arranged to charge the super capacitor;
a flash diode coupled to the super capacitor; and
a first circuit arranged to (i) set a target voltage value to which the super capacitor is to be charged, (ii) provide a current flow through the flash diode at a target current value as the flash diode is being fired, and (iii) terminate charging of the super capacitor at the target voltage value;

wherein the first circuit includes a sampling circuit arranged to periodically sample the current flow through the flash diode and to terminate charging of the super capacitor when the current flow through the flash diode reaches the target current value.

2. The circuit of claim 1, wherein the sampling circuit includes:
a switching device coupled in series with the flash diode; and
a controller arranged to provide periodic sampling pulses to the switching device in order to cause the switching device to conduct during the charging of the super capacitor.

3. The circuit of claim 2, wherein the sampling circuit is further arranged to (i) measure the current flow through the flash diode while providing each sampling pulse and (ii) provide a sense voltage having an amplitude that corresponds to a measured value of the current flow through the flash diode while providing each sampling pulse.

4. The circuit of claim 3, further comprising:
an OR gate having at least a first input, a second input, and an output;
wherein the output of the OR gate is coupled to the switching device; and
wherein the OR gate is arranged to receive the sampling pulses at the first input of the OR gate and to receive a firing signal at the second input of the OR gate, the firing signal configured to cause the switching device to operate in order to fire the flash diode.

5. The circuit of claim 3, further comprising:
a resistor coupled in series with the flash diode and the switching device, wherein the resistor is arranged to provide the sense voltage.

6. The circuit of claim 3, wherein the sampling circuit further includes:
a comparator having at least a first input, a second input, and an output;
wherein the comparator is arranged to (i) receive the sense voltage at the first input of the comparator, (ii) receive a reference voltage at the second input of the comparator, and (iii) provide a comparator output signal at the output of the comparator based on a comparison of the sense voltage with the reference voltage.

7. The circuit of claim 6, wherein the comparator is arranged such that the comparator output signal terminates the charging of the super capacitor.

8. The circuit of claim 6, further comprising:
a flip flop circuit having at least one input coupled to the output of the comparator, wherein the flip flop circuit is arranged to store a state of the comparator output signal at the end of each voltage sense sample period.

9. A circuit for a photo flash, comprising:
a super capacitor;
a charging circuit arranged to charge the super capacitor;
a flash diode coupled to the super capacitor;
a first circuit arranged to (i) set a target voltage value to which the super capacitor is to be charged, (ii) provide a current flow through the flash diode at a target current value as the flash diode is being fired, and (iii) terminate charging of the super capacitor at the target voltage value; and
a current regulator arranged to regulate the current flow through the flash diode;
wherein the first circuit includes a sampling circuit arranged to (i) periodically sample a voltage across the current regulator and (ii) terminate charging of the super capacitor by the charging circuit when the sampled voltage across the current regulator reaches a specified value, wherein the sampled voltage across the current regulator is based on the current flow through the flash diode.

10. The circuit of claim 9, wherein the current regulator circuit is coupled in series with the flash diode.

11. The circuit of claim 10, wherein the current regulator includes:
a differential amplifier with an output, an inverting input, a non-inverting input, and at least one control input;
a transistor with a control electrode, a source electrode and a drain electrode; and
a resistor;
wherein the output of the differential amplifier is coupled to the transistor control electrode of the transistor;
wherein the inverting input of the differential amplifier is coupled to one terminal of the resistor and to the source electrode of the transistor; and
wherein the differential amplifier is arranged to (i) receive the reference voltage at the non-inverting input of the differential amplifier, (ii) receive a control signal at the at least one control input of the differential amplifier, and (iii) provide an output signal responsive to the control signal such that the transistor stops conducting current when the output signal is asserted.

12. The circuit of claim 10, wherein:
the current regulator has at least one control input;
the current regulator is arranged such that, when a control signal is applied to the at least one control input, the current regulator is enabled to conduct current; and
the current regulator is arranged to maintain the current flow through the flash diode substantially at the target current value during sampling of the voltage across the current regulator and firing of the flash diode so long as the voltage sampled across the current regulator exceeds a minimum voltage.

13. The circuit of claim 12, wherein the sampling circuit includes:
a controller arranged to provide periodic sampling pulses to the at least one control input of the current regulator in order to cause the current regulator to conduct during the charging of the super capacitor and to cause the sampling sampled voltage to be provided across the current regulator; and
a source arranged to provide a firing voltage signal to the at least one control input of the current regulator in order to cause the current regulator to conduct and fire the flash diode for a period of time.

14. The circuit of claim 13, wherein the current regulator is arranged to maintain the current flow through the flash diode at substantially the target current value during the period of time.

15. The circuit of claim 13, wherein the sampling circuit is arranged to terminate the charging of the super capacitor when the sampled voltage across the current regulator reaches the specified value such that the current regulator maintains the current flow through the flash diode substantially at the target current value during the period of time.

16. The circuit of claim 15, further comprising:
a comparator having at least a first input, a second input, and an output;
wherein the comparator is arranged to receive the sampled voltage across the current regulator at the first input of the comparator and a reference voltage at the second input of the comparator; and wherein the comparator is arranged such that a comparator output signal terminates operation of the charging circuit when the sampled voltage is greater than the reference voltage.

17. A method, comprising:

setting a voltage value to which a super capacitor is to be charged for firing of a flash diode at a target current value;

charging the super capacitor, the super capacitor having an output coupled to the flash diode;

sampling a voltage on the super capacitor using a current flowing through the flash diode; and terminating the charging when the voltage on the super capacitor has reached the voltage value.

18. The method of claim 17, wherein charging of the super capacitor is terminated when the current flowing through the flash diode reaches the target current value.

19. The method of claim 17, further comprising:

firing the flash diode by discharging the voltage stored in the super capacitor; and maintaining the current flowing through the flash diode substantially at the target current value during a period of time that the flash diode is being fired and the super capacitor discharges.

20. The method of claim 17, wherein sampling the voltage on the super capacitor comprises providing periodic sampling pulses to a switching device coupled in series with the flash diode, the periodic sampling pulses causing the switching device to conduct during the charging of the super capacitor.

* * * * *